United States Patent
Mueller et al.

(10) Patent No.: US 11,740,918 B2
(45) Date of Patent: Aug. 29, 2023

(54) METHOD FOR ACCESSING APPLICATION LOGS WITHIN VIRTUAL MACHINES BASED ON OPERATOR-DEFINED CRITERIA

(71) Applicant: VMware, Inc., Palo Alto, CA (US)

(72) Inventors: Daniel Mueller, Palo Alto, CA (US); Abhishek Srivastava, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 620 days.

(21) Appl. No.: 16/838,597

(22) Filed: Apr. 2, 2020

(65) Prior Publication Data
US 2021/0311761 A1    Oct. 7, 2021

(51) Int. Cl.
G06F 9/455    (2018.01)
G06F 11/34    (2006.01)
H04L 67/02    (2022.01)
H04L 69/16    (2022.01)

(52) U.S. Cl.
CPC ...... *G06F 9/45558* (2013.01); *G06F 11/3476* (2013.01); *H04L 67/02* (2013.01); *H04L 69/162* (2013.01); *G06F 2009/45579* (2013.01); *G06F 2009/45595* (2013.01)

(58) Field of Classification Search
CPC ............. G06F 9/45558; G06F 11/3476; G06F 2009/45579; G06F 2009/45595; G06F 2201/815; G06F 2009/45566; G06F 2009/45591; H04L 67/02; H04L 69/162
USPC .......................................................... 718/1
See application file for complete search history.

(56) References Cited

U.S. PATENT DOCUMENTS

| 8,521,966 | B2 | 8/2013 | Wibling et al. | |
|---|---|---|---|---|
| 2007/0192329 | A1* | 8/2007 | Croft | G06F 3/1415 |
| 2015/0268881 | A1* | 9/2015 | Nielsen | G06F 11/1438 711/114 |
| 2017/0118310 | A1* | 4/2017 | Gilliard | H04L 67/51 |
| 2018/0365044 | A1* | 12/2018 | Movsisyan | H04L 43/00 |
| 2019/0098068 | A1* | 3/2019 | Iliofotou | H04L 67/02 |
| 2020/0334170 | A1* | 10/2020 | Ji | G06F 3/0604 |
| 2022/0043791 | A1* | 2/2022 | Dwarampudi | G06F 8/656 |

OTHER PUBLICATIONS

Ernst, E. et al. "Kata Containers Architecture," GitHub, Inc., 2019, 22 pages, URL: https://github.com/kata-containers/documentation/blob/master/design/architecture.md.

* cited by examiner

*Primary Examiner* — Kenneth Tang
(74) *Attorney, Agent, or Firm* — Kim & Stewart LLP (57) ABSTRACT

Log information is retrieved from a log of a container running in a virtual machine in response to a request for the log information, by accessing a virtual disk of the virtual machine, reading the log of the container from the virtual disk and preparing the requested log information from the log, and transmitting the requested log information to a virtual machine (VM) management process running in a host computer of the virtual machine for the VM management process to forward to a requestor of the log information. Alternatively, log data of the container running in the virtual machine may be streamed to the VM management process over a virtual socket communication channel that is established between the virtual machine and the VM management process.

20 Claims, 5 Drawing Sheets

METHOD FOR ACCESSING APPLICATION LOGS WITHIN VIRTUAL MACHINES BASED ON OPERATOR-DEFINED CRITERIA

BACKGROUND

Applications and their components generate logs during execution of the applications. Application administrators access these logs to monitor the status of the applications and take corrective actions if needed. Different applications might generate logs at a different rate than others, and thus it is desirable to provide administrators with the ability to selectively access portions of the application's logs through a management user interface (UI). In some cases, the management UI may allow administrators to access logs for a previous instance of the application, e.g., in situations where the application crashed. In addition, the UI may allow administrators to access logs for a certain time duration or a certain size.

For applications and their components deployed as containers using Kubernetes®, the containers are spun up within Kubernetes pods by a pod management process known as kubelet, and logs of such containers may be written to STDIO streams. The pod management process captures the logs written to the STDIO streams and stores them in separate log files. In response to a request for information in a log of a particular container, the pod management process reads the log file corresponding to that particular container and returns the requested information.

SUMMARY

One or more embodiments provide access to container logs in a clustered container host system. In a method according to one embodiment, log information is retrieved from a log of a container running in a virtual machine in response to a request for the log information. The method includes the steps of accessing a virtual disk of the virtual machine, reading the log of the container from the virtual disk and preparing the requested log information from the log, and transmitting the requested log information to a virtual machine (VM) management process running in a host computer of the virtual machine for the VM management process to forward to a requestor of the log information.

In a method according to another embodiment, log data of the container running in the virtual machine is streamed to the VM management process over a communication channel that is established between the virtual machine and the VM management process. The method includes the steps of monitoring a standard output stream of the container for log data and streaming the log data to the VM management process over the communication channel for the VM management process to forward to a requestor of the log data. In this method, the request for the log data is an HTTP request transmitted over a TCP communication channel, and the communication channel that the VM management process has established with each of the virtual machines is a virtual socket communication channel.

Further embodiments include a non-transitory computer-readable storage medium comprising instructions that cause a computer system to carry out the above methods, as well as a computer system configured to carry out the above methods.

DETAILED DESCRIPTION

Figure 1:
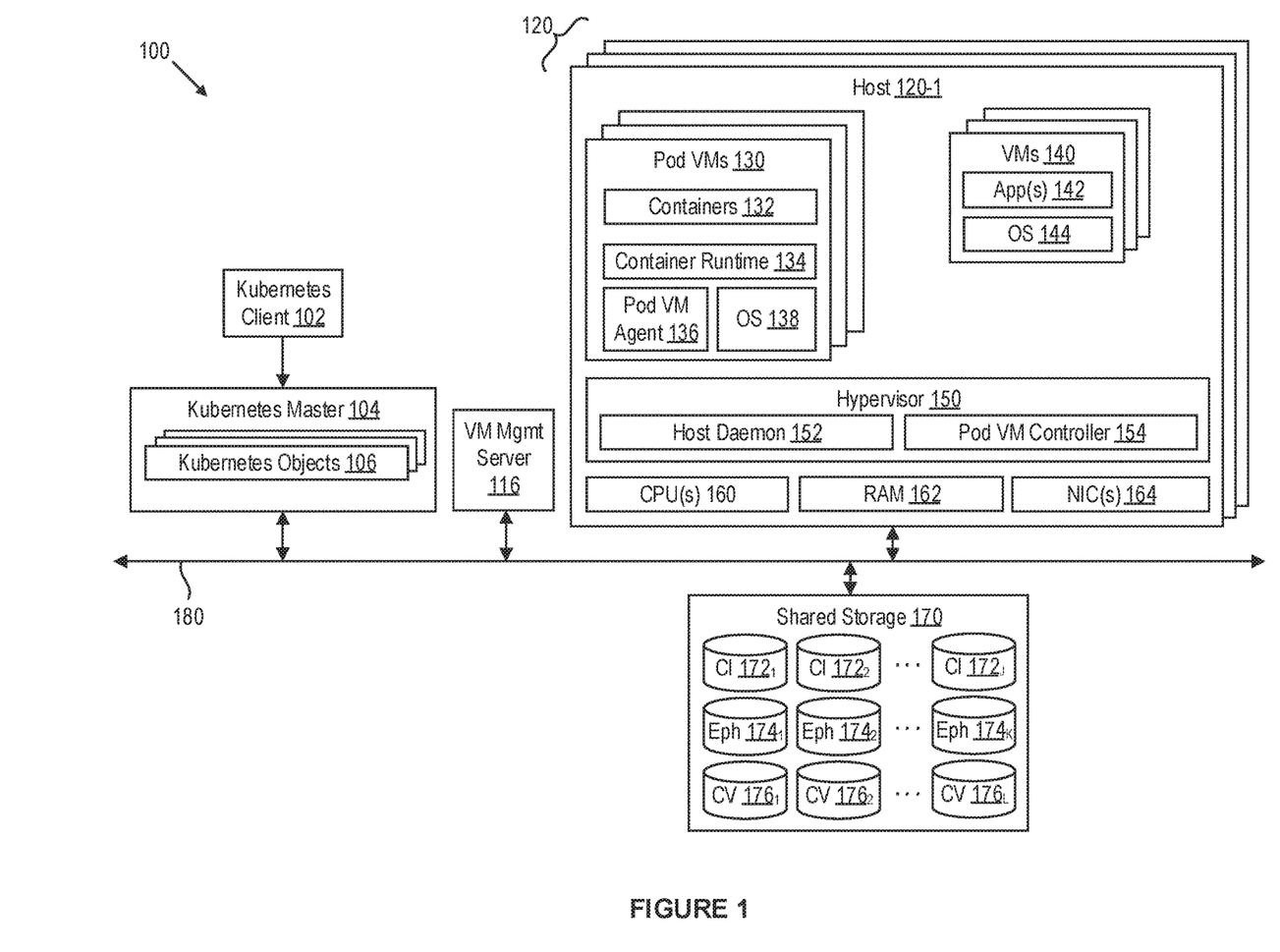
FIG. 1 is a block diagram of a clustered container host system in which embodiments may be implemented.

FIG. 1 is a block diagram of a clustered container host system 100, e.g., a Kubernetes system, in which embodiments may be implemented. System 100 includes a cluster of hosts 120 which may be constructed on a server grade hardware platform such as an x86 architecture platform. The hardware platform includes one or more central processing units (CPUs) 160, system memory, e.g., random access memory (RAM) 162, and one or more network interface controllers (NICs) 164. A virtualization software layer, also referred to herein as a hypervisor 150, is installed on top of the hardware platform. The hypervisor supports a virtual machine execution space within which multiple VMs may be concurrently instantiated and executed. As shown in FIG. 1, the VMs that are concurrently instantiated and executed in host 120-1 include pod VMs 130, which also function as Kubernetes pods, and VMs 140. In addition, all of hosts 120 are configured in a similar manner as host 120-1 and they will not be separately described herein.

In the embodiment illustrated by FIG. 1, hosts 120 access shared storage 170 by using their NICs 164 to connect to a network 180. In another embodiment, each host 120 contains a host bus adapter (HBA) through which input/output operations (IOs) are sent to shared storage 170. Shared storage 170 may comprise, e.g, magnetic disks or flash memory in a storage area network (SAN). In some embodiments, hosts 120 also contain local storage devices (e.g., hard disk drives or solid-state drives), which may be aggregated and provisioned as a virtual SAN device.

VM management server 116 is a physical or virtual server that communicates with host daemon 152 running in hypervisor 150 to provision pod VMs 130 and VMs 140 from the hardware resources of hosts 120 and shared storage 170. VM management server 116 logically groups hosts 120 into a cluster to provide cluster-level functions to hosts 120, such as load balancing across hosts 120 by performing VM migration between hosts 120, distributed power management, dynamic VM placement according to affinity and anti-affinity rules, and high-availability. The number of hosts 120 in the cluster may be one or many. Each host 120 in the cluster has access to shared storage 170 via network 180. VM management server 116 also communicates with shared storage 170 via network 180 to perform control operations thereon.

Kubernetes master 104 is a physical or virtual server that manages Kubernetes objects 106. Kubernetes client 102 represents an input interface for an application administrator or developer (hereinafter referred to as the "user"). It is commonly referred to as kubectl in a Kubernetes system. Through Kubernetes client 102, the user submits desired states of the Kubernetes system, e.g., as YAML files, to Kubernetes master 104. In response, Kubernetes master 104 schedules pods onto (i.e., assigns them to) different hosts 120 (which are also nodes of a Kubernetes cluster in the embodiments), and updates the status of Kubernetes objects 106. The pod VM controllers of the different hosts 120 periodically poll Kubernetes master 104 to see if any of the pods that have been scheduled to the node (in this example, the host) under its management, and execute tasks to bring the actual state of the pods to the desired state as further described below.

Hypervisor 150 includes a host daemon 152 and a pod VM controller 154. As described above, host daemon 152 communicates with VM management server 116 to instantiate pod VMs 130 and VMs 140. Pod VM controller 154 manages the lifecycle of pod VMs 130 and determines when to spin up or delete a pod VM 130.

Each pod VM 130 has one or more containers 132 running therein in an execution space managed by container runtime 134. The lifecycle of containers 132 is managed by pod VM agent 136 (more generally referred to as the "container management process"). Both container runtime 134 and pod VM agent 136 run on top of an operating system (OS) 136. Each VM 140, which is not a pod VM, has applications 142 running therein on top of an OS 144.

Each of containers 132 has a corresponding container image (CI) stored as a read-only virtual disk in shared storage 170. These read-only virtual disks are referred to herein as CI disks and depicted in FIG. 1 as CI $172_{1-J}$. Additionally, each pod VM 130 has a virtual disk provisioned in shared storage 170 for reads and writes. These read-write virtual disks are referred to herein as ephemeral disks and are depicted in FIG. 1 as Eph $174_{1-K}$. When a pod VM is deleted, its ephemeral disk is also deleted. In some embodiments, ephemeral disks can be stored on a local storage of a host because they are not shared by different hosts. Container volumes are used to preserve the state of containers beyond their lifetimes. Container volumes are stored in virtual disks depicted in FIG. 1 as CV $176_{1-L}$.

In the embodiments illustrated herein, "namespaces" are created and used to divide resources, e.g., pod VMs, between multiple users. For example, a pod VM A in a namespace of one user may be authorized to use a CI X that is registered to that user. On the other hand, a pod VM B in a namespace of a different user may not be authorized to use CI X.

In the embodiments, a hypervisor-VM channel is used to enable communication between pod VM controller 154 and all of pod VMs 130 that are managed by pod VM controller 154. One example of hypervisor-VM channel is virtual machine communication interface (VMCI), which is a high-speed interface that VMs on the same host use to communicate with each other and the host's kernel modules. The VMCI circumvents the network layer and it allows applications to work when network access is restricted or unavailable One example implementation of VMCI is described in U.S. Pat. No. 8,521,966, the entire contents of which are incorporated by reference herein. Communication over the hypervisor-VM channel is governed by the so-called virtual sockets protocol, which is a socket protocol commonly available in kernels of hypervisors.

Figure 2:
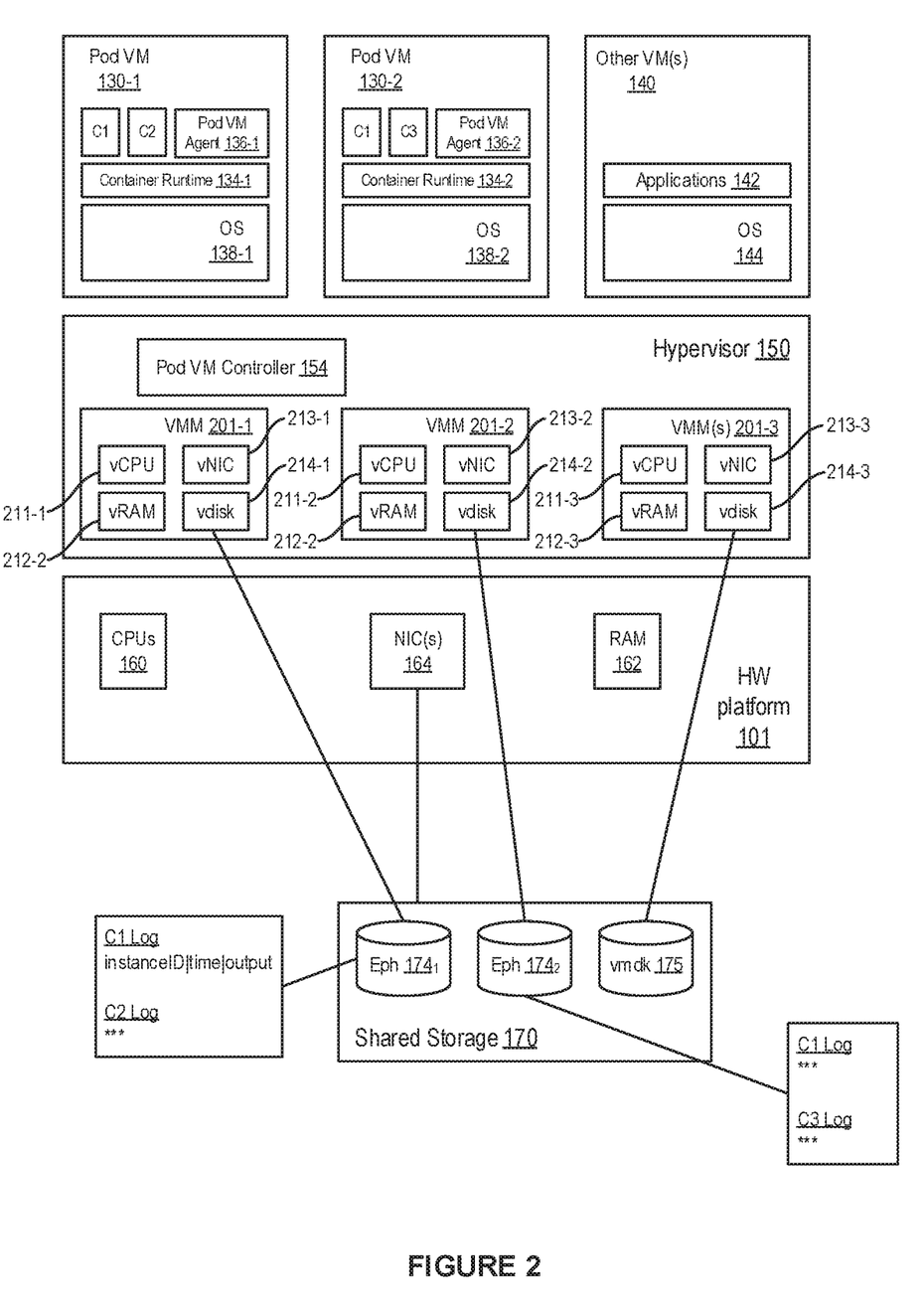
FIG. 2 illustrates additional components of the clustered container host system of FIG. 1.

FIG. 2 illustrates additional components of the clustered container host system of FIG. 1. In FIG. 2, two pod VMs are illustrated, pod VM 130-1 and pod VM 130-2, alongside other (non-pod) VMs 140. Each of the VMs has an associated virtual machine monitor (VMM), depicted as VMM 201-1, VMM 201-2, and VMM 201-3, running as components of hypervisor 150. The VMMs provide a virtual hardware platform for their respective VMs.

The virtual hardware platform for pod VM 130-1 includes a virtual CPU 211-1, a virtual RAM 212-1, a virtual NIC 213-1, and a virtual disk 214-1, which is backed by ephemeral disk $174_1$ provisioned in shared storage 170. The virtual hardware platform for pod VM 130-2 includes a virtual CPU 211-2, a virtual RAM 212-2, a virtual NIC 213-2, and a virtual disk 214-2, which is backed by ephemeral disk $174_2$ provisioned in shared storage 170. The virtual hardware platform for pod VM 130-3 includes a virtual CPU 211-3, a virtual RAM 212-3, a virtual NIC 213-3, and a virtual disk 214-3, which is backed by virtual machine disk 175 provisioned in shared storage 170.

Pod VM 130-1 has containers C1 and C2 running therein in an execution space managed by container runtime 134-1. The lifecycles of containers C1 and C2 are managed by pod NM agent 136-1. Both container runtime 134-1 and pod VM agent 136-1 run on top of an OS 136-1. Similarly, pod VM 130-2 has containers C1 and C3 running therein in an execution space managed by container runtime 134-2. The lifecycles of containers C1 and C3 are managed by pod VM agent 136-2. Both container runtime 134-2 and pod VM agent 136-2 run on top of an OS 136-2.

Each of containers C1 and C2 running in pod N 130-1 has an associated log file in a file system of pod VM 130-1 that has been mounted on virtual disk 214-1. The log file for container C1 running in pod VM 130-1 is depicted in FIG. 2 as "C1 Log." The log file for container C2 running in pod VM 130-1 is depicted in FIG. 2 as "C2 Log."

Similarly, each of containers C1 and C3 running in pod VM 130-2 has an associated log file in a file system of pod VM 130-2 that has been mounted on virtual disk 214-2. The log file for container C1 running in pod VM 130-2 is depicted in FIG. 2 as "C1 Log." The log file for container C3 running in pod VM 130-2 is depicted in FIG. 2 as "C3 Log."

Each entry in the log file corresponds to a log record which has multiple attributes. In one embodiment, the attributes include container's instance ID, time stamp, and log output (depicted as "instanceID," "time," and "output" in FIG. 2). The container's instance ID allows logs of prior instances of the container to be retrieved for evaluation, e.g., for debugging when a prior instance of the container crashed. The time stamp indicates the time at which the log output is generated and populated in the log record. The log output represents data that is output by the container during execution thereof.

Figure 3:
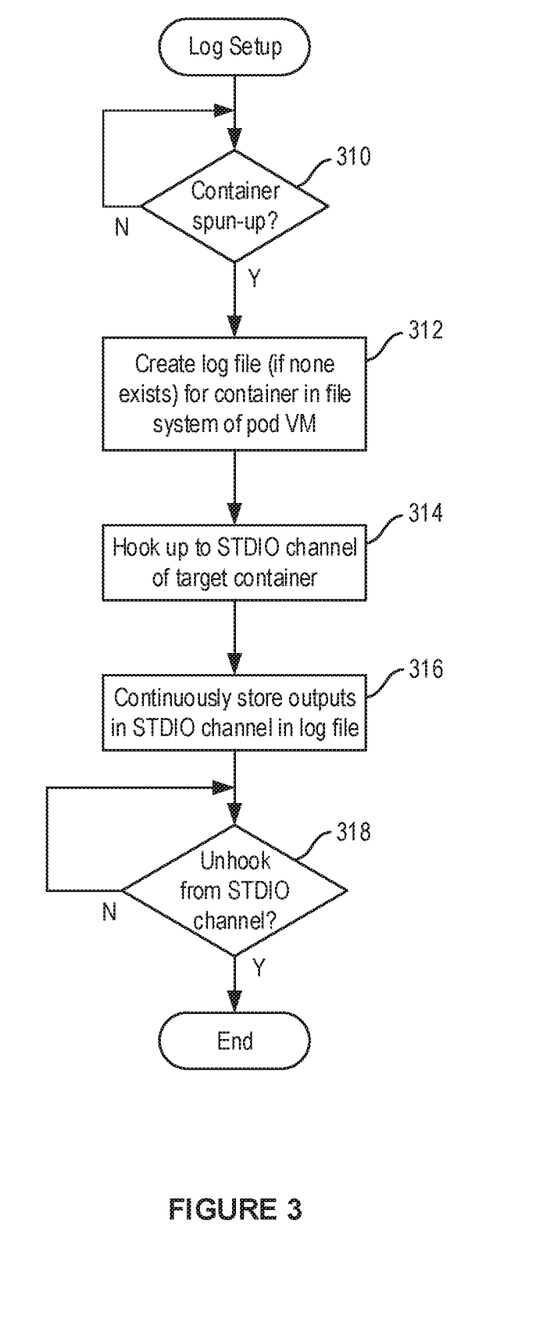
FIG. 3 is a flow diagram illustrating the steps of a method for setting up container logs and recording log data according to embodiments.

FIG. 3 is a flow diagram illustrating the steps of a method for setting up container logs and recording log data according to embodiments. The steps of FIG. 3 are carried out by a container management process (also referred to herein as a pod VM agent, e.g., pod VM agent 136-1 or pod VM agent 136-2). The method begins when the pod VM agent detects at step 310 that a container has been spun up. Then, at step 312, the pod VM agent creates a log file for the container in a file system of the pod VM in which the container has been spun up. If the log file for the container already exists, e.g., in situations where a prior instance of the container exists, this step is skipped.

At step 314, the pod VM agent hooks up to the STDIO channel of the container and monitors the STDIO channel for outputs. Each time an output is detected in the STDIO channel of the container, the pod VM agent at step 316 stores the output in the log file of the container. In particular, the pod VM agent creates a new record in the log file of the container and populates the new record by adding the instance ID of the container to the "instanceID" field, the current time to the "time" field, and the output to the "output" field. Step 316 is executed until the pod VM agent receives an input from the user to unhook from the STDIO channel of the container, e.g., when the user enters a request to pause or terminate logging of the container through Kubernetes client 102.

Figure 4:
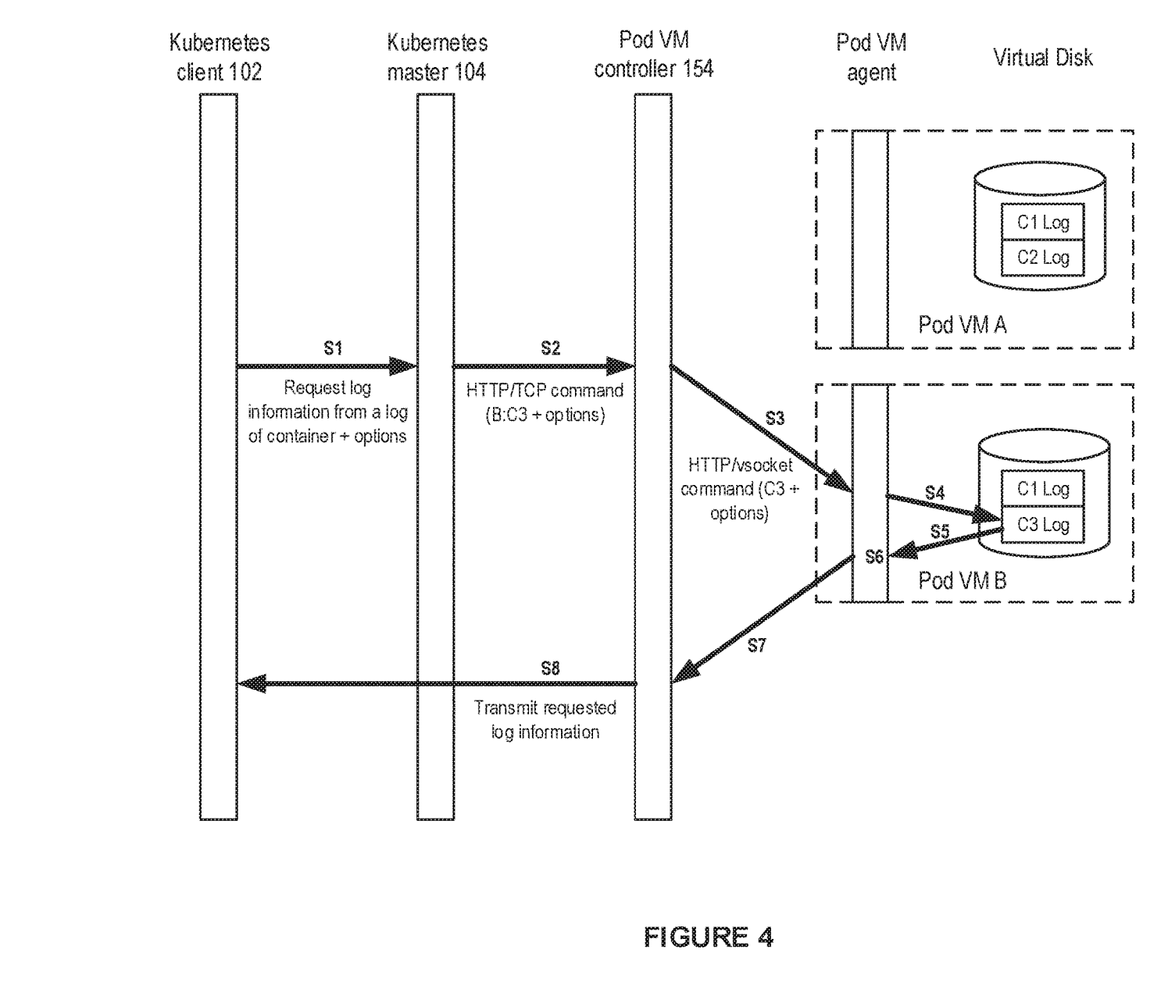
FIG. 4 is a command sequence diagram illustrating the steps carried out by different components of the clustered container host system to retrieve log data according to embodiments.

FIG. 4 is a command sequence diagram illustrating the steps carried out by different components of the clustered container host system to retrieve log data according to embodiments. The command sequence of FIG. 4 begins when the user at step S1 requests log information from a container, along with one or more user specified options. The options include any of the following: (1) a size parameter; (2) time period; (3) instance ID; and (4) streaming. A log information request with a size parameter is a request to return the most recent log data up to a data size equal to the size parameter. For example, a log information request with a size parameter of 5 MB will return the most recent 5 MB of the log data. A log information request with a time period is a request to return the log data that have time stamps that are within the specified time period. For example, a log information request with a time period of one (1) week will return the log data having time stamps that are no older than one week. As another example, a log information request with a beginning date and an ending date will return the log data having time stamps that are between the beginning date and the ending date. A log information request with an instance ID is a request to return the log data that have been recorded for the specified instance ID. For example, when a container crashes during execution, a log information request with an instance ID of the container instance that crashed is made so that the log of the container instance that crashed can be evaluated, e.g, for debugging. A log information request with a streaming option set is a request to stream the outputs from the STDIO channel of the executing container.

In the embodiments illustrated herein, the log information request is made to Kubernetes master 104 using Kubernetes client 102 and that request gets transmitted over a communication channel (e.g., TCP/Ethernet) as an HTTP request by Kubernetes master 104 at step S2. The log information request identifies the pod VM of the target container, the target container, and the user specified options described above. At step S3, upon receiving the HTTP request, pod VM controller 154 parses the HTTP request to identify the pod VM and constructs a new HTTP request to be transmitted over VMCI that has been established between pod VM controller 154 and the identified pod VM. In the example illustrated in FIG. 4, the new HTTP request is transmitted from pod VM controller 154 to a pod VM agent of pod VM B. The new HTTP request includes an identifier of the target container and the user specified options.

Upon receiving the new HTTP request over VMCI, the pod VM agent of pod VM B, at step S4, issues an instruction to read from the log file of the target container. In the example illustrated in FIG. 4, the log file of the target container is "C3 Log." The contents of the log file of the target container are returned to the pod VM agent at step S5 and filtered by the pod VM agent according to the user specified options at step S6. Then, the pod VM agent at step S7 transmits the filtered contents of the log file (which represents the requested log information) to pod VM controller 154, and pod VM controller 154 at step S8 transmits the filtered contents of the log file to Kubernetes client 102.

Figure 5:
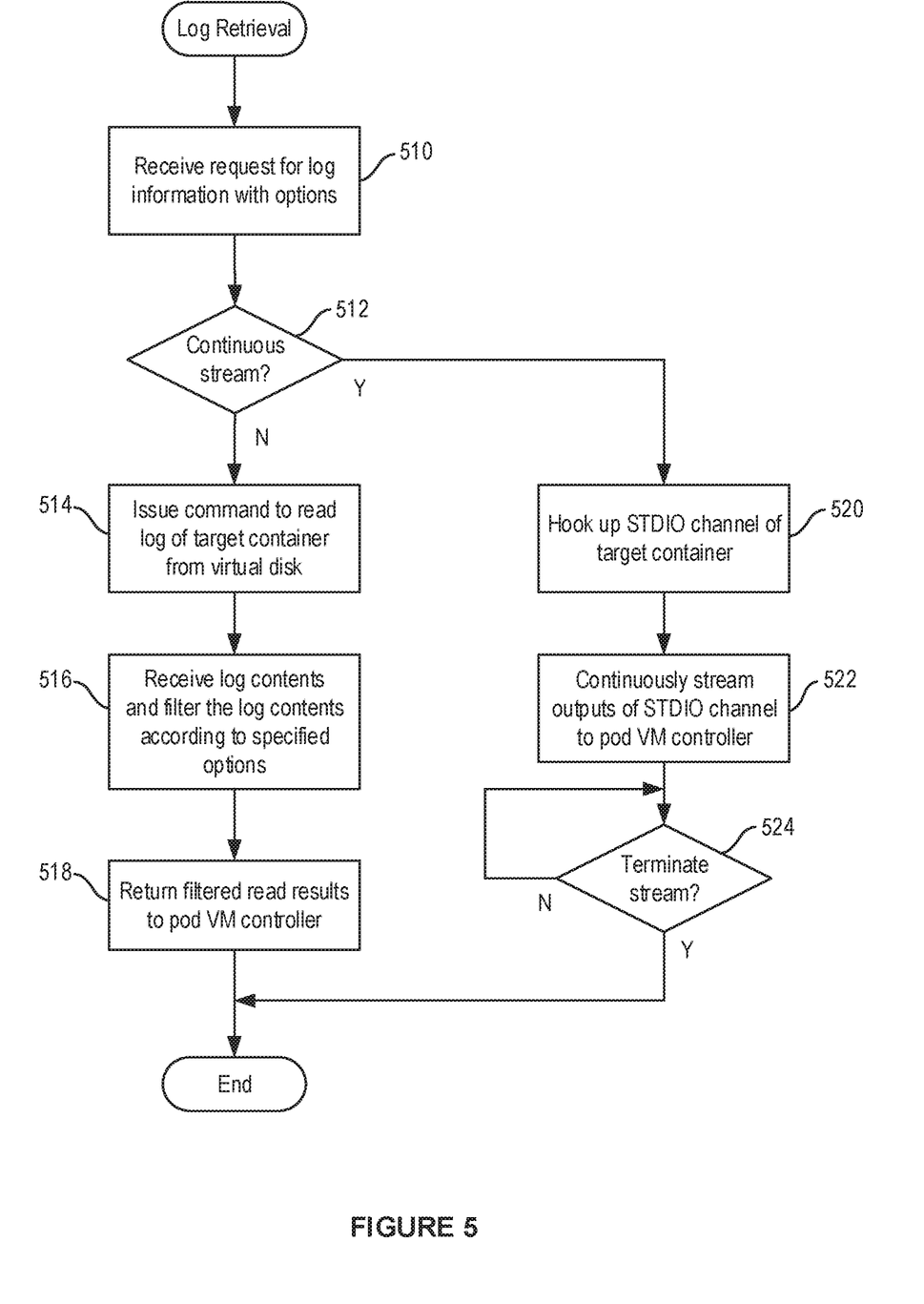
FIG. 5 is a flow diagram illustrating the steps of a method for retrieving log data according to embodiments.

FIG. 5 is a flow diagram illustrating the steps of a method for retrieving log data according to embodiments. The steps of FIG. 5 are carried out by the pod VM agent and correspond to steps S3, S4, S5, S6, and S7 depicted in FIG. 4. The steps of the method depicted in FIG. 5, not depicted in FIG. 4, are steps 512, 520, 522, and 524 and they will be further described below.

The method of FIG. 5 begins at step 510 when the pod VM agent of the target container receives an HTTP request from pod VM controller 154 as described above in conjunction with step S3 depicted in FIG. 4. Then, at step 512, the pod VM agent determines whether or not the user has selected the streaming option with the user specified operation. If not, the pod VM agent executes steps 514, 516, and 518 in the same manner as steps S4, S5, S6, and S7 described above.

On the other hand, if the pod VM agent determines that the user has selected the streaming option with the user specified operation, the pod VM agent at step 520 hooks up to the STDIO channel of the target container, and at step 522 continuously streams outputs of the STDIO channel of the target container to pod VM controller 154. At any time, the user may terminate the streaming through Kubernetes client 102, at which time the method of FIG. 5 ends.

Clustered container host system 100 has been described herein as a Kubernetes system. However, the Kubernetes system is merely one embodiment of clustered container host system 100. Clustered container host systems according to other embodiments may be managed by any other workload management software that enables one or more containers to be run inside VMs.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of retrieving log information from a log of a first container running in a first virtual machine in response to a request for the log information, wherein the first virtual machine is one of a plurality of virtual machines running in a host computer, each of the virtual machines having one or more containers running therein, said method comprising:
in response to the request for the log information, reading by an agent that manages a lifecycle of the one or more containers running in the first virtual machine including the first container, the log of the first container that is retrieved from a virtual disk of the first virtual machine and preparing by the agent, the requested log information from the log, wherein the first virtual machine has an operating system and a container runtime running on top of the operating system, and wherein the first container runs in an execution space managed by the container runtime and the agent runs on top of the operating system; and
transmitting by the agent, the requested log information to a virtual machine (VM) management process running in the host computer for the VM management process to forward to a requestor of the log information, wherein the VM management process manages a lifecycle of the virtual machines running in the host computer including the first virtual machine.

2. The method of claim 1, wherein a second container is also running in the first virtual machine and logs of the first and second containers are both stored in the virtual disk as separate files.

3. The method of claim 2, wherein a third container is running in a second virtual machine, which is one of the plurality of virtual machines running in the host computer, and a log of the third container is stored in a virtual disk of the second virtual machine.

4. The method of claim 1, wherein the VM management process has a communication channel established with each of the virtual machines, and the requested log information is transmitted to the VM management process over the communication channel established between the VM management process and the first virtual machine.

5. The method of claim 4, wherein the request for the log information is an HTTP request transmitted over a TCP communication channel, and the communication channel that the VM management process has established with each of the virtual machines is a virtual socket communication channel.

6. The method of claim 1, wherein the request for the log information specifies options according to which the requested log information is prepared.

7. The method of claim 6, wherein one of the options specifies a size of the log information and most recent log data up to the specified size are prepared as the log information.

8. The method of claim 6, wherein one of the options specifies a time period and log data having timestamps that are within the time period are prepared as the log information.

9. The method of claim 6, wherein one of the options specifies a prior instance of the first container and log data generated during execution of the prior instance of the first container are prepared as the log information.

10. A method of streaming log data of a first container running in a first virtual machine in response to a request for the log data, wherein the first virtual machine is one of a plurality of virtual machines running in a host computer, each of the virtual machines having one or more containers running therein, said method comprising:
in response to the request for the log information, establishing by an agent that manages a lifecycle of the one or more containers running in the first virtual machine including the first container, a communication channel with a virtual machine (VM) management process running in the host computer, wherein the VM management process manages a lifecycle of the virtual machines running in the host computer including the first virtual machine, and the first virtual machine has an operating system and a container runtime running on top of the operating system, and wherein the first container runs in an execution space managed by the container runtime and the agent runs on top of the operating system; and
monitoring by the agent, a standard output stream of the first container for log data and streaming the log data to the VM management process over the communication channel for the VM management process to forward to a requestor of the log data,
wherein the request for the log data is an HTTP request transmitted over a TCP communication channel, and the communication channel that the VM management process has established with each of the virtual machines is a virtual socket communication channel.

11. The method of claim 10, further comprising:
terminating the streaming of the log data to the VM management process over the communication channel in response to a request to terminate the streaming.

12. The method of claim 10, wherein the log data that is streamed is stored in a virtual disk of the first virtual machine.

13. The method of claim 12, wherein the log data of the first container and log data of a second container running in the first virtual machine are stored in the virtual disk of the first virtual machine as separate files.

14. The method of claim 13, wherein a third container is running in a second virtual machine, which is one of the plurality of virtual machines running in the host computer, and log data of the third container is stored in a virtual disk of the second virtual machine.

15. A host computer comprising:
a processor configured to execute a virtual machine (VM) management process that manages a lifecycle of virtual machines running in the host computer including at least first and second virtual machines, wherein the first virtual machine includes an operating system, a container runtime running on top of the operating system, and an agent running on top of the operating system, wherein the agent manages a lifecycle of the one or more containers running in an execution space managed by the container runtime, and executes the steps of:
in response to a request for first log information from a log of a first container running in the first virtual machine, reading the log of the first container that is stored in a virtual disk of the first virtual machine, preparing the requested first log information from the log of the first container, and transmitting the requested first log information to the VM management process running in the host computer for the VM management process to forward to a requestor of the first log information; and
in response to a request for second log information from a log of a second container running in the first virtual machine, reading the log of the second container that is stored in the virtual disk of the first virtual machine, preparing the requested second log information from the log of the second container, and transmitting the requested second log information to the VM management process running in the host computer for the VM management process to forward to a requestor of the second log information.

16. The host computer of claim 15, wherein the logs of the first and second containers are both stored in the virtual disk as separate files.

17. The host computer of claim 15, wherein the second virtual machine has an agent running therein, which manages a lifecycle of one or more containers, including a third container, running in the second virtual machine, and a log of the third container is stored in a virtual disk of the second virtual machine.

18. The host computer of claim 15, wherein the requested first and second log information are transmitted to the VM management process over a communication channel established between the VM management process and the first virtual machine.

19. The host computer of claim 18, wherein the request for the first and second log information is an HTTP request transmitted over a TCP communication channel, and the communication channel established between the VM management process and the first virtual machine is a virtual socket communication channel.

20. The host computer of claim 15, wherein the requests for the first and second log information each specify options according to which the requested first and second log information are prepared.

\* \* \* \* \*